US005951156A

United States Patent [19]

Evrard et al.

[11] Patent Number: 5,951,156

[45] Date of Patent: *Sep. 14, 1999

[54] MOTOR VEHICLE HEADLAMP HAVING A REFLECTOR CAPABLE OF PRODUCING, BY ITSELF, A LIGHT BEAM WITH A V-SHAPED CUT-OFF

[75] Inventors: Laurent Evrard, Paris; Denis Saladin, Sceaux, both of France

[73] Assignee: Valeo Vision, Bobigny, Cedex, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/744,916

[22] Filed: Nov. 7, 1996

[30] Foreign Application Priority Data

Nov. 8, 1995 [FR] France .................................. 95 13203

[51] Int. Cl.[6] ...................................................... B60Q 1/04

[52] U.S. Cl. .......................... 362/518; 362/346; 362/307; 362/297

[58] Field of Search .................................... 362/518, 346, 362/307, 297

[56] References Cited

U.S. PATENT DOCUMENTS

| | | | |
|---|---|---|---|
| 4,772,988 | 9/1988 | Brun . | |
| 4,945,454 | 7/1990 | Bunse et al. . | |
| 5,461,549 | 10/1995 | Lietar | 362/518 |
| 5,651,610 | 7/1997 | Fadel . | |

FOREIGN PATENT DOCUMENTS

| | | |
|---|---|---|
| 0 331 928 | 9/1989 | European Pat. Off. . |
| 0 558 949 | 9/1993 | European Pat. Off. . |
| 2 536 502 | 1/1987 | France . |
| 2 599 121 | 9/1988 | France . |
| 2 130 704 | 11/1982 | United Kingdom . |

OTHER PUBLICATIONS

French Search Report dated Jul. 19, 1996.

*Primary Examiner*—Sandra O'Shea
*Assistant Examiner*—Marshall Honeyman
*Attorney, Agent, or Firm*—Morgan & Finnegan, LLP

[57] ABSTRACT

A motor vehicle headlamp has a light source, such as the filament of an incandescent lamp, of a kind which emits light freely around it, together with a reflector and a cover lens. The reflector is adapted so that, by reflection from the light source, it can produce, by itself, a light beam which is delimited by a cut-off defined by a horizontal half cut-off line and a raised cut-off line which is raised by a predetermined angle of cut-off elevation with respect to the horizontal.

The reflector consists of two zones, which are separated by two transition half planes that pass close to the source, namely a first zone consisting of a surface for producing images of the light source offset on the side towards the horizontal half cut-off line and extending below, and close to, the latter, and a second zone consisting of a surface which produces images of the light source offset on the side towards the raised half cut-off line and extending below and close to the latter.

17 Claims, 4 Drawing Sheets

MOTOR VEHICLE HEADLAMP HAVING A REFLECTOR CAPABLE OF PRODUCING, BY ITSELF, A LIGHT BEAM WITH A V-SHAPED CUT-OFF

FIELD OF THE INVENTION

The present invention relates in general terms to motor vehicle headlamps, and more particularly to a novel headlamp, the reflector of which is designed for cooperation with a light source which does not have a masking cup, that is to say a light source which emits light freely around it, for the purpose of forming a cruising light beam of the normalized European type.

Such a "European" light beam is delimited by a cut-off which is defined in a normalised projection plane by two straight half-lines, or half planes, one of which is horizontal on the offside of a travelling vehicle (i.e. on the left for a vehicle driving on the right hand side of the road), while the other half-line is on the nearside, i.e. the same side as the verge of the road, closest to the vehicle: this half-line or half plane being inclined upwardly by an angle (α, referred to as the angle of cut-off elevation, this angle having a value of about 15 degrees.

Such a cut-off profile is usually referred to as a V-shaped cut-off.

For driving on the right, the horizontal half cut-off line is on the left, while the raised half cut-off line is on the right.

BACKGROUND OF THE INVENTION

Numerous documents, some of which are in the name of the present Applicants, are known, which describe reflectors the purpose of which is to achieve the above mentioned criteria.

In particular, French patent specification No. FR 2 536 502A, which corresponds to U.S. Pat. No. 4,530,042 to Cibiéet al., discloses a reflector which is mathematically defined in such a way that it positions the various images of a light source, such as a cylindrical filament, below a straight cut-off line, and preferably with the highest points of these images being situated close to the said cut-off line.

Other documents, and in particular U.S. Pat. No. 4,772, 988 to Brun, which is again in the name of the present Applicants, discloses reflectors which are adapted to form the same kind of light beam, but with improved photometry and/or improved width.

It should be observed here that a light beam having a substantial width, obtained with the aid of an uncorrected reflector, enables the size of the striations or light diverting prisms formed on the cover lens of the headlamp to be minimised. This is of advantage in the context of styling, and also in terms of optical considerations, especially if the lens is steeply inclined with respect to the vertical, as is often the case in modern vehicles having a sharply plunging front profile.

DISCUSSION OF THE INVENTION

The present invention aims to provide a novel solution which is particularly simple, for producing a normalized European cruising light beam in which the width of the light beam is preformed, and the cutoff is well defined, all of this being capable of being achieved in the absence of any intervention by the cover lens.

According to the invention, a motor vehicle headlamp, comprising a light source such as the filament of an incandescent lamp, for emitting light freely around it, a reflector, and a cover lens, the reflector being adapted to produce by itself a light beam which is bounded by a cutoff line defined by a horizontal half cut-off line and a half cut-off line which is raised by a predetermined angle of cut-off elevation with respect to the horizontal, is characterised in that the reflector consists of two zones which are separated from each other by two transition half planes, passing close to the light source, a first one of the said zones consisting of a surface which produces images of the source which are offset on the side towards the horizontal half cut-off line and which extend below, and close to, the said horizontal cut-off line, while a second one of the said zones consists of a surface which produces images of the source which are offset on the side towards the raised half cut-off line and which extend below, and close to, the raised half cut-off line.

In a first preferred embodiment of the invention, a first one of the said transition half planes is substantially horizontal, while the second transition half plane is offset angularly with respect to a lower vertical half plane, on the opposite side of the latter from the said first half plane, by a value which is substantially equal to one half of the angle of elevation of the raised half cut-off line, the said first zone being the zone having the greater angular extent.

In a second preferred embodiment of the invention, the first and second transition half planes are aligned with each other and offset angularly with respect to two vertical half planes, namely an upper and a lower half plane respectively, in the same direction and by the same angle as each other, this angle of offset being substantially equal to one half of the angle of elevation of the raised half cut-off line.

Preferably, all of the images of the light source have their highest point situated close to the respective half cut-off line.

Further aspects, objects and advantages of the present invention will appear more clearly on a reading of the following detailed description of two preferred embodiments of the invention, which is given by way of non-limiting example only and with reference to the accompanying drawings.

DESCRIPTION OF PREFERRED EMBODIMENTS OF THE INVENTION

Figure 2:
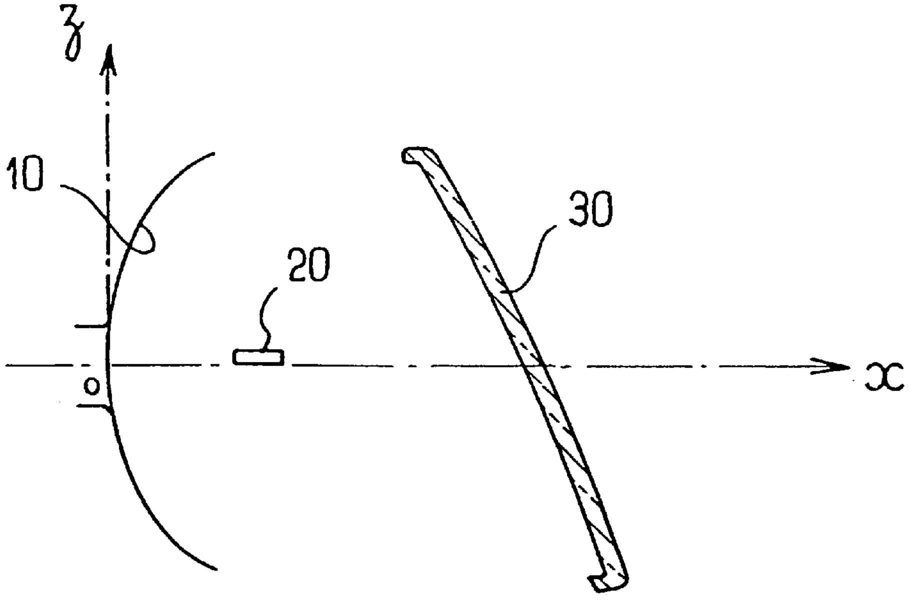
FIG. 2 is a view, in axial vertical cross section, of the reflector of FIG. 1 and its associated light source.

Reference is first made to FIG. 2, which shows a reflector 10 of a motor vehicle headlamp. The headlamp also includes a light source, for example the incandescent filament 20 of a lamp which is mounted in a lamp hole 11 in the reflector. It also includes a cover lens 30, which is either slightly striated or smooth.

In this example, the reflector consists of two zones 12*a* and 12*b*. The first zone 12*a* extends over 262.5 degrees, i.e. it subtends this angle at the centre O, between a first boundary or transition half plane P1, which is horizontal, and a second boundary or transition half plane P2, which is offset angularly by an offset angle of 7.5 degrees with respect to a vertical half plane, extending downwardly from the centre O and indicated as a phantom line in FIG. 1. The second zone 12*b* occupies the remainder of the reflector, subtending an angle of 97.5 degrees at the centre O, between the two boundary half planes P1 and P2. The values of angles quoted above are not in any way to be considered as limiting. They correspond to the case where the angle of cut-off elevation a is chosen to be equal to 15 degrees.

In the present example, the zone 12*a* is made in accordance with equation (2) on pages 8 and 9 of French patent specification No. FR 2 599 1 21A, which is as follows:

$$x=y^2/4f_h+z^2/(4f_h\cdot(4f_h\cdot f_v+y^2)/4f_h^2+y^2),$$

$$\text{where } f_h=f_o+(\underline{l}/n)\cdot(y/|y|)$$

$$\text{and } f_v=f_o-(z/z|z|)\cdot(\underline{l}+r/2+r/4(1+(z/|z|)))$$

Figure 1:
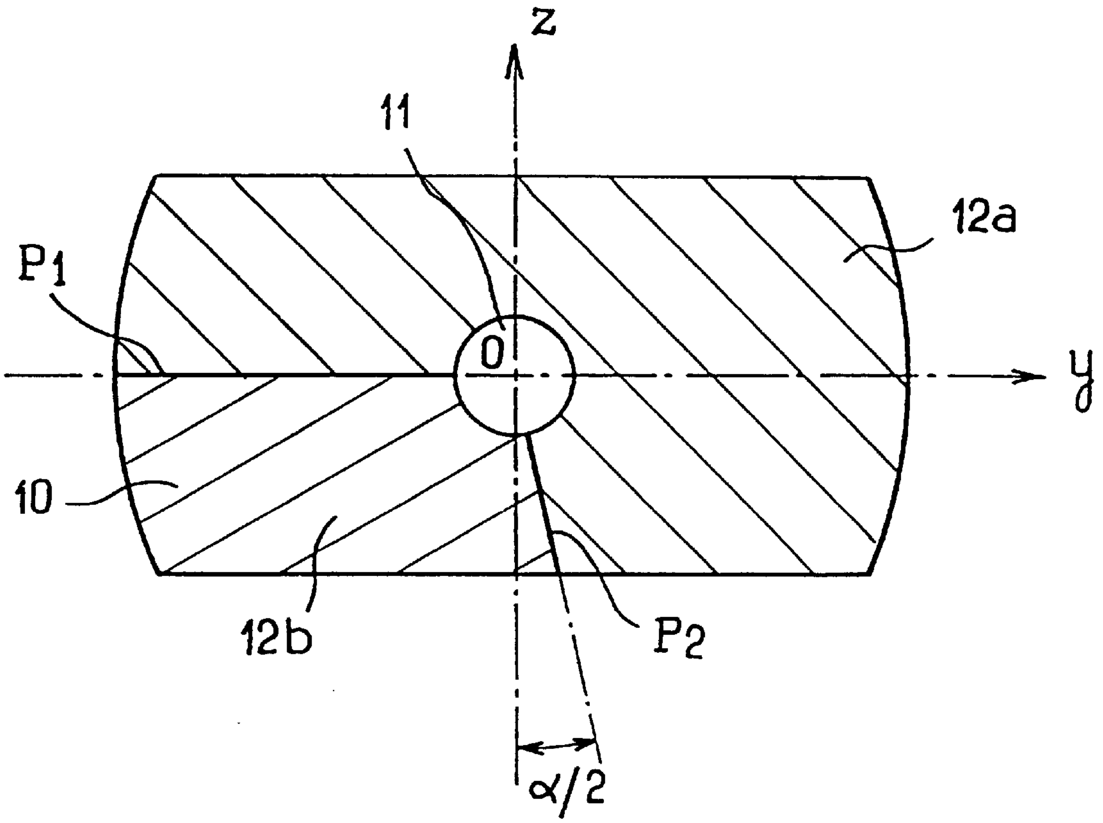
FIG. 1 is a rear view of the reflector of a headlamp in a first embodiment of the invention.

In these equations:

(x,y,z) are the Cartesian coordinates for the axes shown in FIGS. 1 and 2, $f_o$ is an imaginary focal distance equal to the following distance Ox between the origin O and the centre of the filament in the axial direction, $\underline{l}$ is the half length of the filament, r is the radius of the filament, and n is a positive real parameter which is selected within the range from 0 to +∞.

A surface of this kind is capable of producing images of the filament which are all situated below and close to a horizontal cut-off line, and which are offset—in the present case towards the left—with respect to the reference centre H which lies on the optical axis.

As to the zone 12*b*, this is made in accordance with equation (3), Col. 5, lines 29–48 of the above mentioned U.S. Pat. No. 4,772,988, so as to have the same type of surface as the zone 12*a*, with an offset angle of 15 degrees (though again, this value is in no way limiting). However, in this case the parameters in the equation are so selected as to ensure that the images of the filament are offset towards the right.

This equation (3) is as follows:

$$x=(y\cos\alpha+z\sin\alpha)^2/4f_h+(z\cos\alpha-y\sin\alpha)^2/(4f_h\cdot(4f_h\cdot f_v+(y\cos\alpha+z\sin\alpha)^2)/4f_h^2+(y\cos\alpha+z\sin\alpha)^2),$$

$$\text{where } f_h=f_o+(l/n)\cdot((y\cos\alpha+z\sin\alpha)/|(y\cos\alpha+z\sin\alpha)|)$$

$$\text{and } f_v=f_o-((z\cos\alpha-y\sin\alpha)/|(z\cos\alpha-y\sin\alpha)|)\ (\underline{l}+r/2+r/4(l+((z\cos\alpha-y\sin\alpha)/|(z\cos\alpha-y\sin\alpha)|)))$$

and where the constants, parameters and variables are as before, αbeing the relief angle of the raised or inclined half cut-off line Hc. The value of this angle may for example be 15 degrees.

It should be observed here that the surfaces of the zones 12*a* and 12*b* are joined together with a first order continuity at the transition half plane P2, that is to say there is between the surfaces a very slight curve but no deviation or step. In practice, this curve is attenuated so that it disappears during the operation of polishing the mould or press tool which is used in the manufacture of the reflector.

A discontinuity between the profiles of the two surfaces exists in theory in the plane P1. This discontinuity may be minimised so as practically to disappear, by adjusting the parameters in the two equations quoted above. In another version, it is possible to offset the plane P1 by 7.5 degrees downwardly in order to guarantee the first order continuity.

Figure 3A:
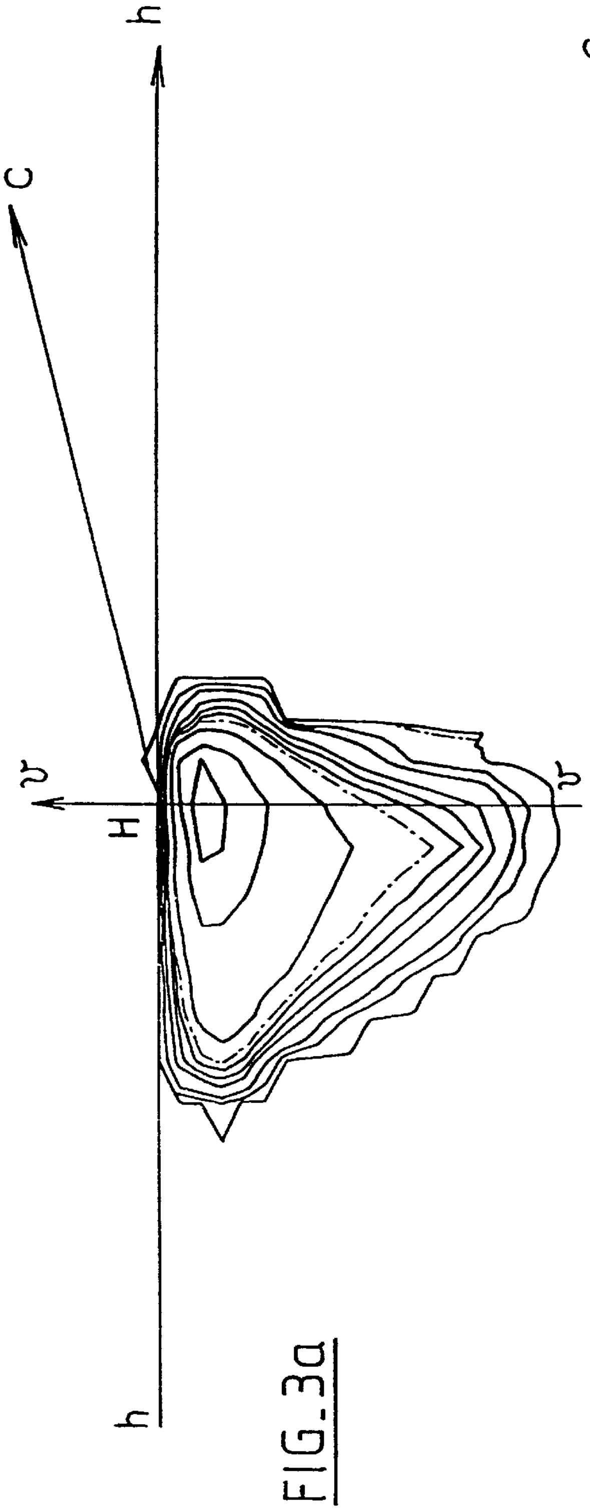
FIG. 3*a* is a diagram with a set of curves of constant luminous intensity in a projection plane, showing the illumination obtained from a first zone of the reflector of FIGS. 1 and 2, the reflector being uncorrected.

Reference is now made to FIG. 3*a*. In this Figure, each of the curves is a curve of constant luminous intensity in a normalised projection plane (H, h, v), illustrating the photometry of the part of the beam which is produced by the zone 12*a* in the absence of a correcting cover lens. It will be observed that the horizontal half cutoff line Hh is defined very cleanly over a substantial length, and that there is a satisfactorily high concentration of light in the vicinity of the axis.

The images of the source which are produced by the first zone 12*a* are offset on the side of the horizontal cut-off line.

Figure 3B:
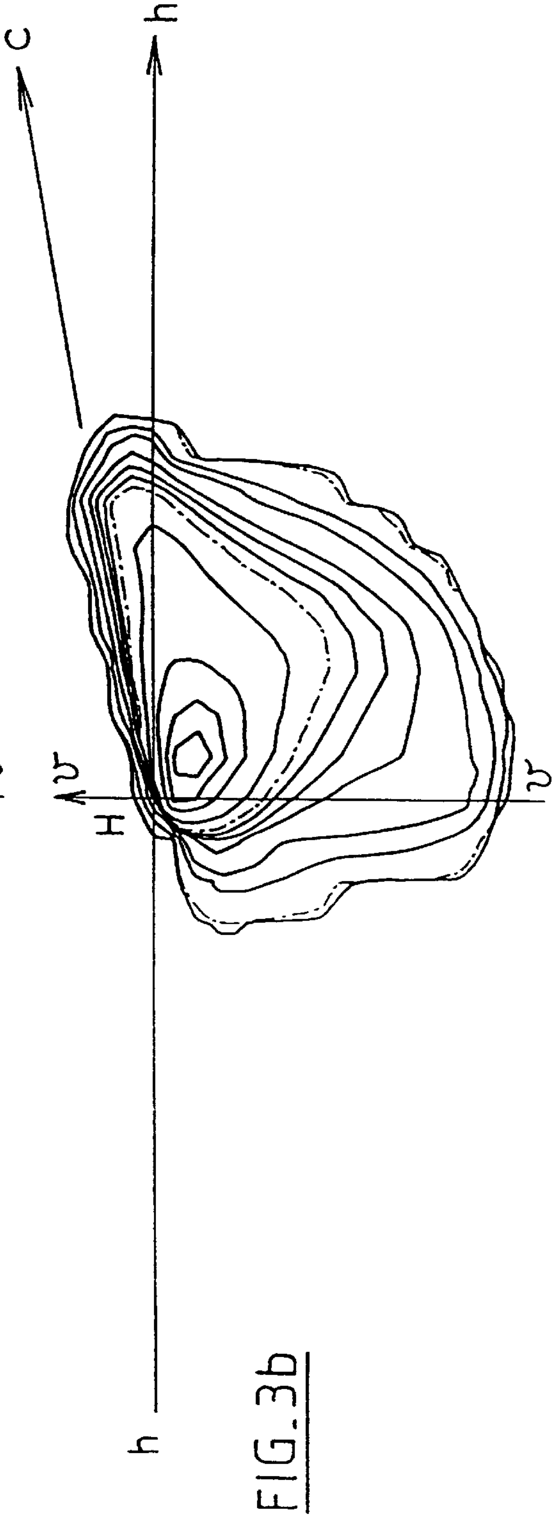
FIG. 3*b* is a diagram with a set of curves of constant luminous intensity in a projection plane, showing the illumination obtained from a second zone of the reflector of FIGS. 1 and 2, the reflector being uncorrected.

FIG. 3*b* shows the photometry which is obtained for the zone 12*b*. It will be noticed that a clean raised half cut-off line Hc of considerable length is obtained, and that the concentration immediately to the right of the axis is satisfactory for the purpose of illuminating the verge in the distance. The images of the source which are produced by the second zone 12*b* are offset towards the side of the raised half cut-off line.

Figure 4:
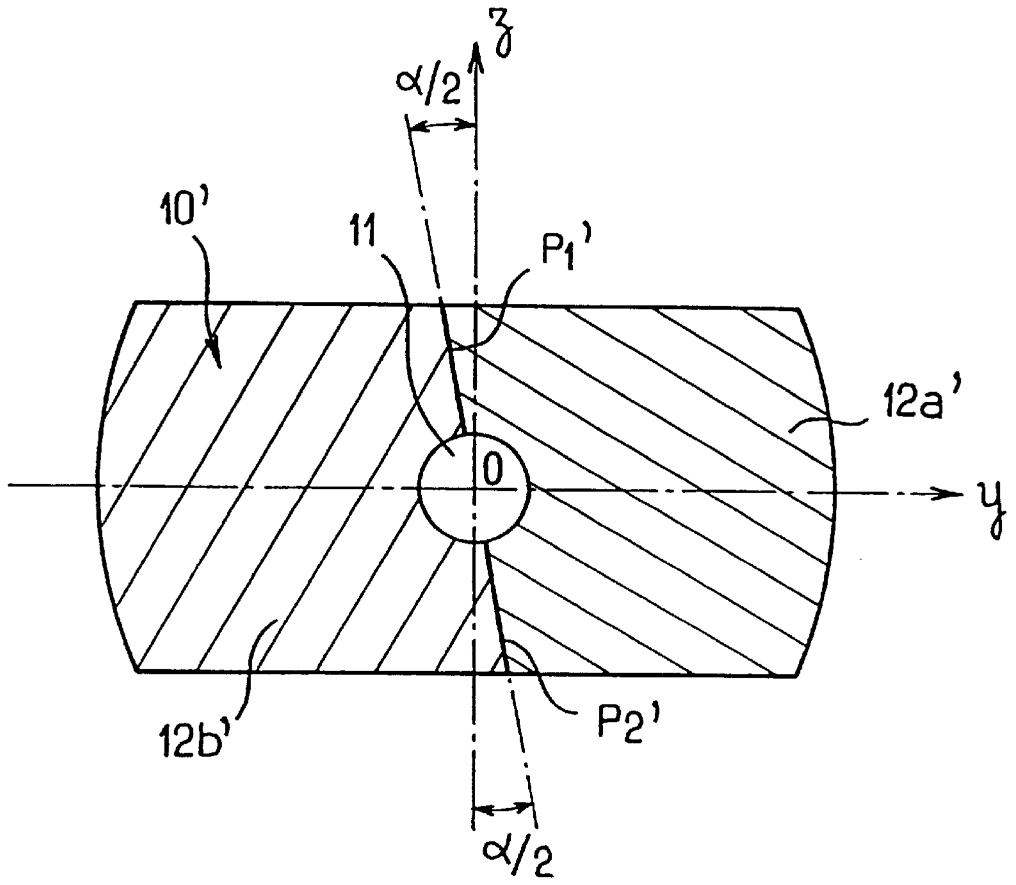
FIG. 4 is a rear view of the reflector of a headlamp in a second embodiment of the invention.
Figure 5:
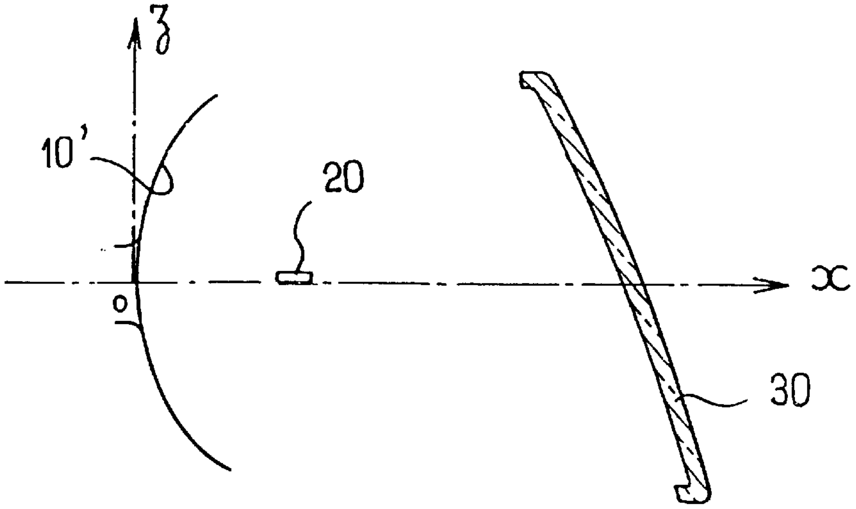
FIG. 5 is a view in axial vertical cross section of the reflector of FIG. 4 and of its associated light source.

Reference is now made to FIGS. 4 and 5 showing a second embodiment of the invention, in which the reflector 10' consists of two zones 12*a*' and 12*b*', which are separated by two boundary or transition half planes P1' and P2'. These two half planes are aligned with each other and are offset by an offset angle of 7.5 degrees (which value is again in no way limiting), in the anticlockwise direction with respect to the upper and lower vertical half planes, respectively, which constitute the vertical plane intersecting the centre O and indicated at z in FIG. 4 in a phantom line.

The surface of the zone 12*a*' is in accordance with equation (2), quoted above, of the above mentioned U.S. Pat. No. 4,772,988, while the zone 12*b*' is in accordance with the above mentioned equation (3). Using these equations, and with the transition half planes disposed as shown, a first order continuity is obtained at the junction between these two half planes, in the same way as in the first embodiment described above.

Figure 6A:
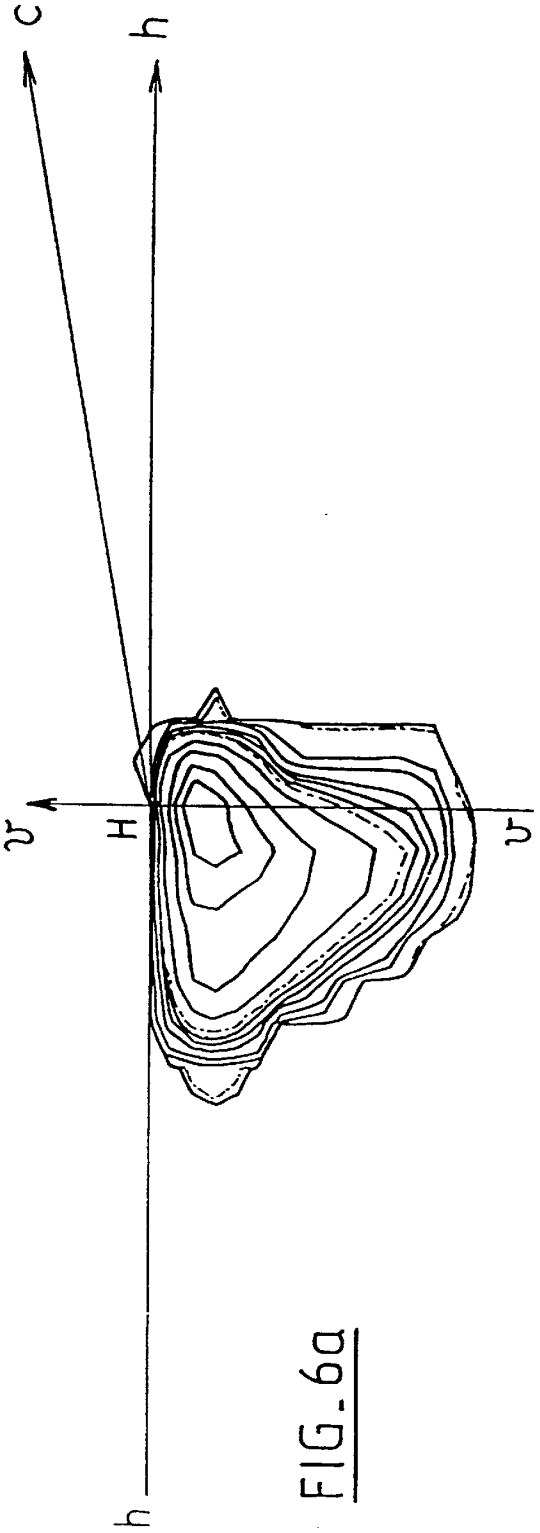
FIG. 6*a* is a diagram with a set of curves of constant luminous intensity in a projection plane, showing the illumination obtained from a first zone of the reflector of FIGS. 4 and 6, the reflector being uncorrected.
Figure 6B:
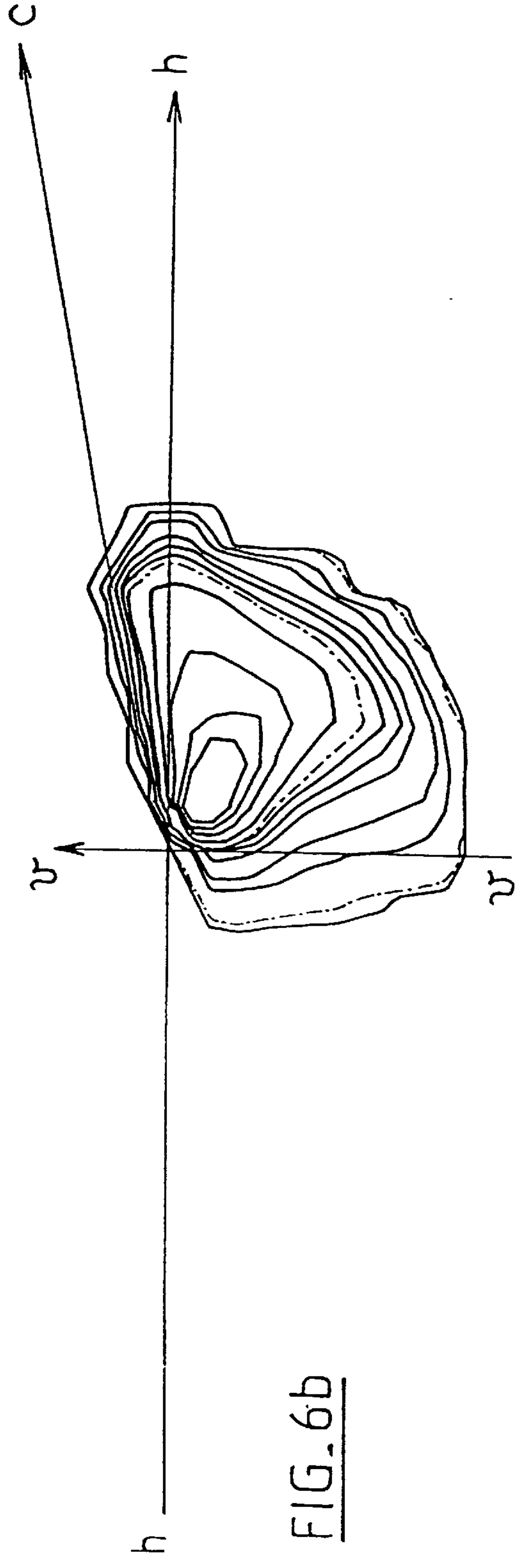
FIG. 6*b* is a diagram with a set of curves of constant luminous intensity in a projection plane, showing the illumination obtained from a second zone of the reflector of FIGS. 4 and 6, the reflector being uncorrected.

With reference to FIGS. 6*a* and 6*b*, these show the photometry of the two parts of the beam which are obtained respectively with the zones 12*a*' and 12*b*' in the absence of a correcting cover lens. In this embodiment, the part of the beam that extends below the inclined half cut-off line Hc of the normalized projection screen is reinforced in intensity.

The present invention is of course in no way limited to the embodiments described above and shown in the drawings; the normal person skilled in the art will be able to apply to them any variation or modification in accordance with the spirit of the invention.

What is claimed is:

1. A motor vehicle headlamp comprising:

a light source;

a reflector, disposed behind the light source, adapted to produce by itself, by reflection of light from the light source, a light beam delimited by a cut-off defined on one side of a vertical reference plane by a horizontal half cut-off line and defined on another side of the vertical reference plane by a raised half cut-off line, the raised half cut-off line being raised by a predetermined angle of cut-off elevation with respect to the horizontal half cut-off line, the reflector having (a) a first zone, (b) a second zone, and (c,d) two transition half planes joining the first and second zones together, the transition half planes passing close to the light source, the first zone comprising a surface configured for producing images of the light source offset on the side of the horizontal half cut-off line and extending below and close to the horizontal half cut-off line, and the second zone comprising a surface configured for producing images of the light source which are offset on the side of the raised half cut-off line, and extending below and close to the raised half cut-off line, at least one of the two transition half planes is substantially vertical, being offset by an offset angle substantially equal to one half the angle cut-off elevation; and a cover lens disposed to receive the light beam from the reflector.

2. A headlamp according to claim 1, wherein one of the transition half planes is substantially horizontal, the reflector defines a lower vertical half plane and another of the transition half planes is angularly offset with respect to the lower vertical half plane on the opposite side of the reflector from the first half plane, by an offset angle substantially equal to one half of the angle of cut-off elevation, the first zone having a greater angular extent than the second zone.

3. A headlamp according to claim 1, wherein the reflector defines an upper vertical half plane and a lower vertical half plane aligned with each other, the first and second transition half planes being aligned with each other and offset with respect to the upper and lower vertical half planes respectively, in the same direction and by a common off-set angle, the off-set angle being substantially equal to one half of the angle of cut-off elevation.

4. A headlamp according to claim 1, wherein images produced by the reflector define a highest point in the vicinity of the horizontal and the raised half cut-off lines.

5. A reflector defining a vertical reference plane comprising:

a first reflective surface configured to form a light beam at or below a generally straight horizontal half cut-off line, and on one side of the vertical reference plane;

a second reflective surface configured to form a light beam at or below a generally straight half cut-off line raised by a predetemined angle, α, of cut-off elevation with respect to the horizontal half cut-off, on the second side of the vertical reference plane; and a pair of reflective transition half-planes interposed between the first and second reflective surfaces, at least one of the transition half planes being substantially vertical, offset by an offset angle substantially equal to one half the angle of cut-off elevation.

6. A reflector according to claim 5, wherein the first reflective surface has a greater angular extent than the second reflective surface.

7. A reflector according to claim 5, wherein a first and a second transition half plane of the pair of transition half-planes are on opposite sides of the reflector, and wherein a first of the transition half-planes is substantially horizontal and a second of the transition half-planes is angularly offset with respect to a lower vertical half-plane defined by the reflector by an angle substantially equal to one half of angle α.

8. A reflector according to claim 5, wherein a first of the transition half-planes is angularly offset with respect to the lower vertical half-plane in the same direction and by the substantially the same angle as a second of the transition half-planes, and wherein the first and the second transition half-planes are aligned in an upper vertical transition half-plane defined by the reflector, aligned with said upper vertical half-plane.

9. A reflector according to claim 5, wherein the reflector is arranged to receive light from a light source and adapted to produce light beams with highest points close to the horizontal and raised half cut-off lines.

10. A headlamp comprising:

a cover glass;

a light source disposed behind the cover glass and arranged to emit light substantially all around the lamp;

a reflector disposed behind the light source, defining a vertical reference plane;

wherein the reflector comprises; (a) a first reflective surface configured to form a light beam at or below a generally straight horizontal half cut-off Line, and on one side of the vertical reference plane, (b) a second reflective surface configured to form a light beam at or below a generally straight and raised half cut-off line, raised by a predetermined angle, α, of cut-off elevation with respect to the horizontal half cut-off, on the second side of the vertical reference plane, and (c,d) a pair of reflective transition half-planes interposed in between the first and second reflective surfaces, at least one of the transition half planes being substantially vertical, offset by an offset angle substantially equal to on half the angle of cut-off elevation.

11. A headlamp according to claim 10, wherein the first reflective surface has a greater angular extent than the second reflective surface.

12. A headlamp according to claim 10, wherein the first and second transition half-planes are on opposite sides of the reflector, wherein the first transition half-plane is substantially horizontal and the second transition half-plane is angularly offset with respect to a lower vertical half-plane defined by the reflector by an angle substantially equal to one half of angle α.

13. A headlamp according to claim 10, wherein the first and second transition half-planes are on opposite sides of the reflector, wherein the first transition half-plane is angularly offset with respect to the lower vertical half-plane in the same direction as, and by the substantially the same angle as, the second transition half-plane, and wherein the first and second transition half-planes are aligned in an upper vertical transition half-plane defined by the reflector, aligned with the upper vertical half-plane.

14. A headlamp according to claim 10, wherein the reflector is arranged to receive light from the light source and adapted to produce light beams with highest points close to the horizontal and raised half cut-off lines.

15. A headlamp according to claim 10, wherein the cover glass is substantially smooth, whereby the cover glass causes no significant deviation of the light.

16. A motor vehicle comprising a headlamp according to claim 10.

17. A headlamp for a motor vehicle comprising:

a cover glass;

a light source disposed behind the cover glass and arranged to emit light freely substantially all around the lamp;

a reflector arranged to receive light from the light source and adapted to produce light beams with highest points close to the horizontal and raised half cut-off lines, disposed behind the light source, defining a vertical reference plane;

wherein the reflector has (a) a first reflective surface subtending an angle substantially equal to 262.5° about a median point on the reflector, the first surface for forming a light beam at or below a generally straight horizontal half cut-off line, and on one side of the vertical reference plane, (b) a substantially horizontal transition half-plane on one side of the median point, (c) a second reflective surface subtending an angle substantially equal to 97.5° about the median point, the second surface for forming a light beam at or below a generally straight and raised half cut-off line, raised with respect to the horizontal half cut-off line an angle substantially equal to 15°, on the second side of the vertical reference plane, and (d) a raised transition half-plane on the other side of the median point, angularly offset with respect to a lower vertical half-plane defined by the reflector by an angle substantially equal to 7.5°, and wherein the horizontal transition half-plane and the raised transition half-plane are interposed between the first and second reflective surfaces and the horizontal transition half-plane is angularly offset with respect to the lower vertical half-plane in the same direction as, and by the substantially the same angle as, the raised transition half-plane, and wherein the horizontal and raised transition half-planes are aligned in an upper vertical transition half-plane defined by the reflector, and aligned with the upper vertical half-plane.

* * * * *